INVENTOR.
FLORIAN F. DAUENHAUER
ATTORNEY

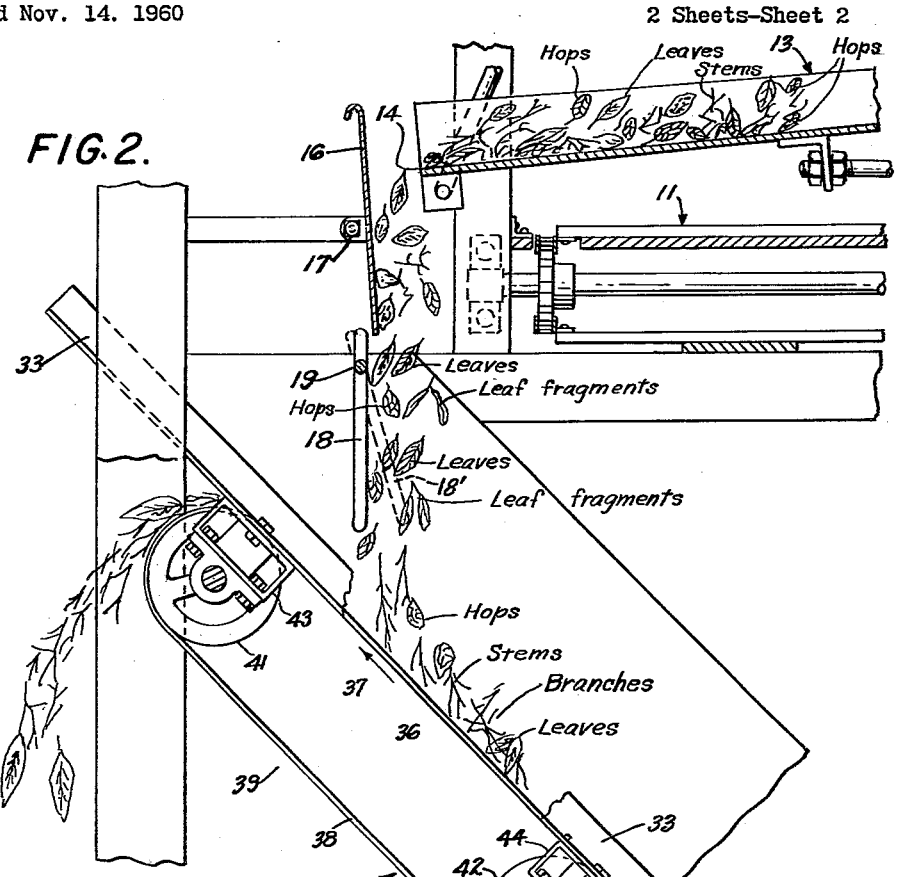

United States Patent Office 3,106,522
Patented Oct. 8, 1963

3,106,522
HOP SEPARATION FLIGHTS
Florian F. Dauenhauer, 2860 Lomitas Ave.,
Santa Rosa, Calif.
Filed Nov. 14, 1960, Ser. No. 68,749
6 Claims. (Cl. 209—267)

The invention, in general, relates to devices for removing foreign material from mixtures of the foreign material and hops and thus separating the hops therefrom. More particularly, the present improvement relates to the combination of separating screens with means for retarding the movement of portions of the moving mixtures of hops and foreign material to free such portions for quick removal thereof from the mixtures.

This application is a continuation-in-part of my copending application, Serial No. 670,567, filed July 8, 1957, now Patent No. 2,983,380, and entitled "Method and Equipment for Separating Hops From Foreign Material."

As stated in the above-mentioned pending application, the stripping of hops from hop vines by mechanical means results in the by-product of mixtures of considerable foreign material and stripped hops; such foreign material including vine fragments, branches, leaves and leaf fragments as well as long and short stems all commingled with individual hops. And, it has continuously been a problem in the art to reduce such foreign material to a minimum in order to avoid deleterious factors in beverages utilizing hop. The present invention is directed to the provision of means for effecting the separation of an appreciably increased quantity of leaves and leaf fragments at a hop-cleaning stage prior to the final cleaning stage so that the end result is appreciably cleaner hops having much less than 1% of foreign material intermingled or commingled therewith.

A primary object of the present invention is to provide hop separation flights capable of effecting the removal of substantial quantities of leaves and leaf fragments from moving mixtures of hops intermingled and commingled with foreign material, including leaves and leaf fragments.

Another important object of the invention is to provide improved hop separating flights of the indicated nature which are additionally characterized by their ability to relieve the load on the final cleaner or clean-up separating equipment and make the latter more effective in reducing the quantity of foreign material in mixtures of hops and foreign material.

A still further object of the present improvement is to provide hop separation flights of the aforementioned character which can readily be installed at a minimum of expense for utilization with hop separating machines of any type.

Other objects of the invention, together with some of the advantageous features thereof, will appear from the following description of a preferred embodiment of the present improvement as well as the preferred method of attaining the objects stated. It is to be understood, however, that I am not to be limited to the precise embodiment illustrated in the annexed drawings, nor to the precise arrangements of the various components thereof, nor to the precise mode of carrying out the improved method, as my invention, as defined in the appended claims, can be embodied in a plurality and variety of forms and can be carried out in a plurality and variety of ways.

Referring to the drawings:

FIG. 2 is an enlarged side elevational view of one component of the preferred embodiment of the present invention, including the top endless screen together with associated elements for directing moving mixtures of hops and foreign material onto the same.

FIG. 3 is an enlarged front elevational view of the lower pulleys of the top and bottom endless screens illustrated in FIGS. 1 and 2.

FIG. 4 is an end view of the pulleys illustrated in FIG. 3.

Figure 1:
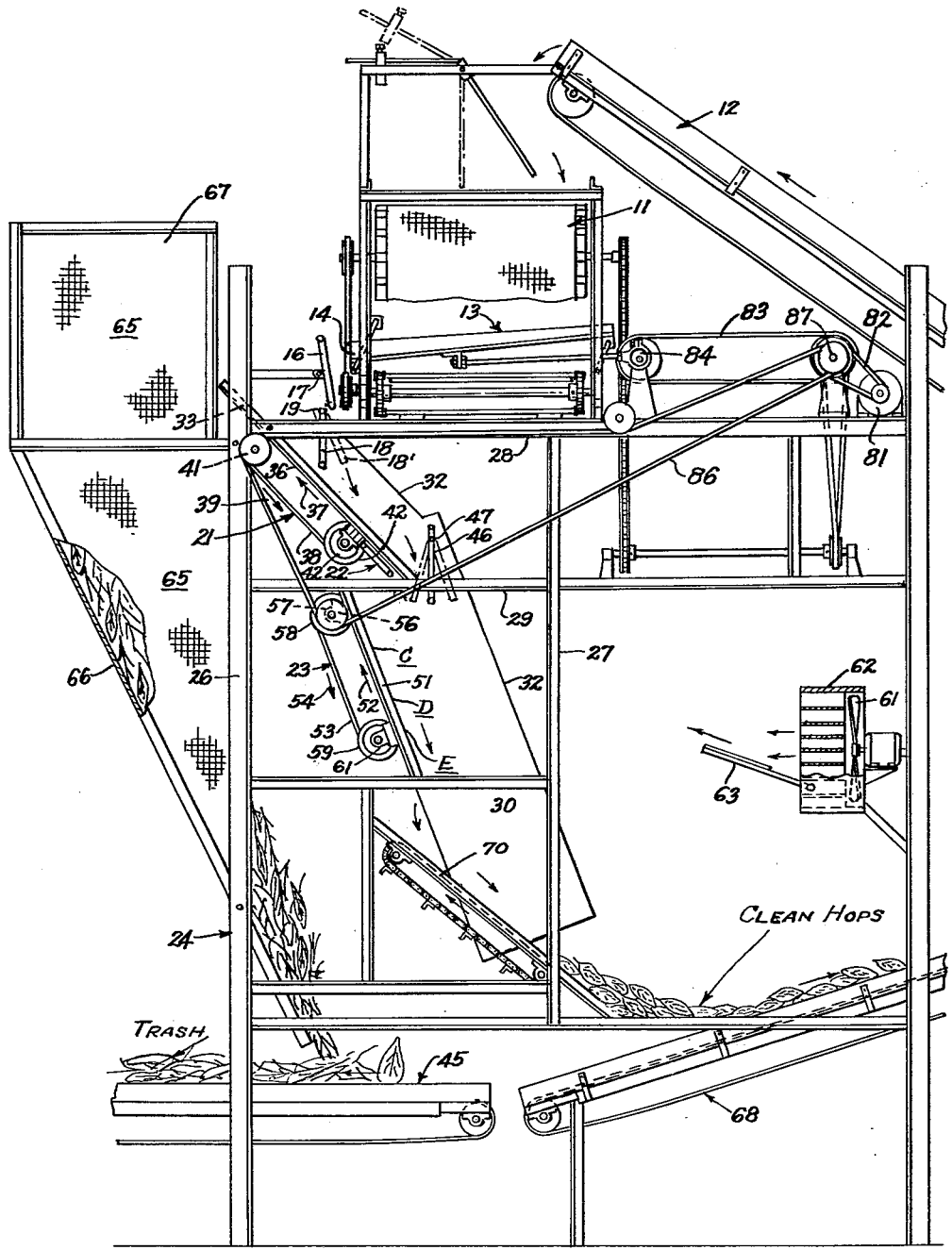
FIG. 1, is a side elevational view of a preferred embodiment of the present improvement illustrating inclined top and bottom endless screens with an intermediate inclined imperforate surface all constituting components of the present improvement.

In its preferred form, my improved hop separation flights for removing foreign material from mixtures of foreign material and hops thereby affording cleaner hops preferably comprises an elevated first endless screen movably mounted at an inclination to the vertical, an imperforate plate supported contiguous to the lower end of said first endless screen, and an elevated second endless screen supported at a less angle of inclination to the vertical than said first endless screen and movably mounted contiguous to the lower end of said imperforate plate, together with means for directing moving mixtures of hops and foreign material onto said first endless screen adjacent to the upper end thereof, means for moving said endless screens with their upper runs moving counter-clockwise so as to carry foreign material over the top thereof, and means for directing strong currents of air toward the upper end of said second endless screen and adjacent to the lower end of said imperforate plate to blow leaves and leaf fragments separated from said moving mixtures of hops and foreign material against the mesh of said second screen for removal over the top pulley thereof.

While the hop separation flights of the present invention can be associated with equal effectiveness with any discharge outlet or chute of any type of hop-picking machine through which mixtures of stripped hops and foreign material are passed, the present improvement has been especially designed for application to and association with the power trommel of my invention which is illustrated, described and claimed in my copending application, Serial No. 68,739, filed November 14, 1960, and entitled "Power Trommel." Accordingly, and solely for purposes of illustration, I shall describe the present improvement in hop separating flights in that environment.

As illustrated particularly in FIG. 1 of the annexed drawings, the aforementioned power trommel is shown as being mounted at an elevation and is designated generally by the reference numeral 11; the trommel receiving mixtures of stripped hops and foreign material including leaves, branches, hop clusters, fragments of leaves as well as short and long vine stems, from an elevator conveyor 12 leading from a hop-picking machine, not shown. The action of the pocket or power trommel 11 effects the separation of appreciable amounts of foreign material from the mixtures with the screened mixtures dropping onto a shaker conveyor 13 of the trommel and thence from the shaker outlet of the trommel to discharge onto the upper screen of the hop separating flights of the present improvement. A suitable baffle 16 is adjustably supported by means of a pin 17 secured to a support of the framework adjacent to the outlet 14 of the trommel for directing the screened moving mixtures of hops and foreign material onto the hop separating flights of my present improvement. In order to diffuse the mass of hops and foreign materials continuously discharged from the outlet 14 of the trommel so that it may be spread over the extent of the upper run of the top component of my improved hop separating flights, I provide an adjustable deflector 18 which is pivotally mounted on a pin 19 secured to supporting elements, hereinafter described of the framework for the flights, with the deflector normally retained in a vertical position, as indicated by the full lines 18 in FIG. 1 of the annexed drawings. If the mixtures discharged from the trommel are relatively heavy, the deflector 18 may be adjusted at an angle to the vertical, as indicated by the dotted lines 18', while if the discharge load is relatively light from the trommel, the deflector may be moved back to a vertical position as indicated by the full lines 18.

In accordance with my present invention, I provide a series of three hop separating flights which preferably are arranged in juxtaposition, as shown, and which, in my preferred embodiment, comprises a first or top endless mesh screen 21, an intermediate imperforate plate 22 supported contiguous to but depending from said top screen 21, and a bottom or second endless mesh screen 23. The flights 21 and 23 are movably mounted on a suitable open framework, designated generally by the reference numeral 24, which includes spaced uprights 26 and 27 as well as cross-beams 28, 29 and 30 spanning and connected to the uprights 26 and 27. In addition to the open framework 24, I provide partial sides or closures 32 for supporting other components of the combination. The first or top endless mesh screen 21 is supported on an inclined angle-bar 33 suitably secured to the framework at an appreciable elevation from the ground or floor and at an angle of approximately 45° to the vertical so that those hops which separate from the mixtures of hops and foreign material will roll or move down the endless screen 21 at a reasonably rapid rate.

The first or top endles mesh screen 21 is preferably mounted for rotation so that the upper run 36 thereof moves upwardly or in the direction of the arrow 37, while the lower run 38 of the screen moves downwardly or in the direction of the arrow 39. To this end, the mesh screen 21 is trained over top and bottom pulleys 41 and 42, respectively, and such pulleys are driven as hereinafter described. Each of the pulleys 41 and 42 is coextensive in width with the width of the screen 21; the top pulley 41 being journaled in suitable brackets 43 secured to the inclined angle-bar 33 of the framework 24, and the bottom pulley 42 being journaled in adjustable brackets 44 also secured to the inclined angle-bar 33 by means of bolts and slots connections. Any other suitable means, of course, can be employed for mounting the screen 21 for rotation. With the screen 21 in motion, and with moving mixtures of hops and foreign material being continuously deposited upon and spread over the upepr run 36 thereof, there will be some gravity separation of small stems and broken leaves from the mixtures which will pass through the mesh of the screen 21 and will fall by gravity onto a moving trash conveyor 45, shown schematically at the lower left of FIG. 1 of the annexed drawings, and thus carried away. Some of the foreign material which does not pass through the mesh of the endless screen 21 will be carried up and over the top pulley 41 of the screen 21 to fall also by gravity onto the trash conveyor 45. Some of the foreign material including the larger stems and larger leaves as well as hops embedded therewith as well as loose individual hops will move down the incline of the inclined belt 21 onto the intermediate imperforate plate 22.

An important feature of my improved hop separating flights comprises this intermediate flight consisting of the imperforate plate 22 which serves to appreciably retard the rate of movement of the leaves or leaf fragments constituting some components of the mixtures of foreign material in the discharged moving mixtures of hops and foreign material from the trommel 11. It is to be appreciated that some portions, as stated above, of the leaves and leaf fragments as well as some of the long stems are removed from the moving mixtures by the top endless screen 21 and removed by the moving trash conveyor 45. However, there will be a considerable quantity of leaves and leaf fragments that will move down the flight 21, as stated, with some separation of individual hops taking place along the lower end of the screen 21. Those large leaves and leaf fragments of the moving mixtures that strike the imperforate plate 22 will be retarded in their movement by the fact that the imperforate plate 22 is stationary and inclined to the vertical as is the endless screen 21 to which the plate 22 is connected, such retarded leaves and leaf fragments moving at the slower rate dropping off the lower edge of the plate to be removed as hereinafter described. The imperforate plate 22 preferably is fabricated of light-weight steel or other light-weight metal and is formed to a width coextensive with the width of the screen 21. Conveniently, the plate 22 is secured to the underside of a projected extension 44' of the brackets 44 that carry the pulley 42, so as to lie substantially parallel to the longitudinal axis of the screen 21 but slightly below the same, as shown, and so as to be adjusted correspondingly to any adjustment of the extension 44' or of the brackets 44 whenever a tensioning of the endless screen 21 is made. In other words, the contiguous relationship between the lower end of the belt 21 and the upper end of the imperforate plate 22 is always maintained the same despite any tensioning or slackening of the belt 21 by adjustment of the brackets 44 along the inclined angle 33 by the bolt and slot connections thereof to such angle bar. Adjacent to the imperforate plate 22 or just below the lower end of the mesh screen 21, I conveniently adjustably mount a second deflector 46 by means of a pivot pin 47 secured between the side closures 32 of the machine. The adjustable deflector 46 controls the fall of hops that have been separated from the moving mixtures as they leave the screen 21 and plate 22 onto the second or bottom mesh screen 23; the hops dropping to the screen 23 at various locations indicated by the reference characters C, D and E. The adjustment of the deflector 46 to positions away from the vertical is indicated by the dotted line showings thereof in FIG. 1 of the annexed drawings, such adjustments being made in accordance with the lightness or the heaviness of the load, i.e., the mass of mixtures of hops and foreign material under separating process at any given time.

In accordance with the present improvement, I mount the second or bottom endless screen 23 for rotation so that the upper run 51 thereof moves in the direction of the arrow 52, while the lower run 53 thereof moves in the direction of the arrow 54; or counter-clockwise, the screen 23 being conveniently mounted or journaled in bearings 56 at the top which are mounted in brackets 57 secured to the framework and trained over top pulley 58, as shown. The endless screen 23 also is trained over a lower pulley 59 which is a self-cleaning pulley as is the case of the lower pulley 42 of the top endless screen, as hereinafter described. The lower pulley 59 of the endless screen 23 is journaled in suitable brackets 61 secured to the framework as shown so that the inclined angle bar extending between the cross-beams 29 and 30 for supporting the endless screen 23 is disposed at a less angle to the vertical than the upper screen 23. In practice, I preferably arrange that the inclination of the angle bar which supports the endless screen 23 is approximately 30° from the vertical or approximately 60° from the horizontal.

Associated with the bottom or second endless mesh screen 23 are means for directing air blasts continuously onto the screen so that leaves which are separated from the hops are held to the screen belt 23 by the air blasts and are carried up and over the top pulley 58 thereof for removal by gravity from the moving masses of hops and foreign material to fall onto the trash conveyor 45 and carried away. The leaves which are held against the screen 23 by the air blasts are those leaves mainly which have been retarded in their rate of movement by the imperforate plate 22 and which drop off the edge thereof and are momentarily suspended in the air until the air blast strikes against them to force the leaves onto the mesh screen 23. Thus the action or function of the imperforate plate 22 is especially important for effecting the continuous removal of appreciably larger leaves and fragments that are a part of the moving mixtures of hops and foreign material dropped onto the hop separation flights; such larger leaves and leaf fragments dropping off the lower edge of the imperforate plate in momentary suspension away from the moving mixtures to be struck by the air blast driven against the upper run 51 of the endless mesh screen and by such action removing considerable quantities of foreign material from the moving mixtures and relieving the load of the final cleaner.

The hops that are separated by endless screen 23 from the moving mixtures which are, of course, in addition to the hops that are separated from the mixtures by the top or first endless screen 21 and by the separator plate 22, are caused to move or allowed to move down the endless screen 23 in a somewhat rolling action for deposition onto the multi-slotted surface, designated generally herein by the reference numeral 70, which is described and claimed in my copending application, Serial No. 670,567, filed July 8, 1957, now Patent No. 2,983,380, herein above mentioned.

The means for directing air blasts onto the bottom or lower endless screen 23 conveniently may consist of a fan or other blower 61 which is supported on the main frame of the machine at an elevation approximately the same as the elevation of the lower endless screen 23; the air blast means also including on the outer face of the housing 62 for the fan an adjustable deflector vane 63 for controlling the direction of the stream of air that emanates from the fan 61. The air blast is such that it will flatten the leaves that are separated from the mixtures of hops and foreign material by the action of the imperforate plate 22 against the upper run of the lower endless mesh screen 23 as above described. Those hops and short vine stems that are not separated out by the mesh of the endless screen 23 are carried down and onto the multi-slotted surface 70, as described, and by the action of such multi-slotted surface continuous removal of very small leaves and small vine stems through the slots of the surface is effected so that the clean hops are deposited on a take-off conveyor 68, indicated schematically at the lower right of FIG. 1 of the drawings.

In FIG. 3 of the annexed drawings, I have illustrated in enlarged view the construction of the self-cleaning lower pulleys 42 and 59 of the top and bottom endless screens 21 and 23, respectively, of the preferred embodiment of the present improvement; such pulleys 42 and 59 each preferably consisting of identical perforated heads 71 and 72 at opposite ends thereof through which accumulated material in the open pulleys 42 and 59 can emerge. As shown, the pulleys are so formed as to provide therein a central imperforate disc, designated generally by the reference numeral 74, to divide each pulley into two separate compartments 76 and 77. Within each of the compartments 76 and 77 I provide a series of longitudinally extending rods 78 and within each of the compartments interiorly of the rods 78 I provide a helix 79 so coiled that foreign material, which might otherwise collect within the pulleys and clog the same, will be conveyed by each of the helices 79 from the central discs 74 outwardly through the openings 80 in the heads 71 and 72 of these pulleys 42 and 59. As a result of this construction of pulleys, short or long stems or leaf fragments which drop into these open pulleys in the hop separating actions of the first and second or top and bottom flights of the preferred embodiment of the present improvement and which otherwise would accumulate in such pulleys and clog the same will be conveyed outwardly to both perforated ends of the pulleys to be discharged therefrom and to be collected in the trash conveyor 45 below the flights.

Any suitable driving means can be employed for effecting the travel of each of the endless belts 21 and 23 around their respective pulleys. In the present improvement I employ as driving means an electric motor 81 which is connected by means of a belt and pulley drive 82 as well as a pair of belt and pulley drives 83 to the eccentric axle 84 of the shaker 13 to drive the same intermittently, together with a series of belt and pulley drives 86 from driven shaft 87 to the top pulleys 41 and 58 of the top and lower flights 21 and 23 of the present improvement, with a return belt and pulley drive to the shaft 87 thus driving both screens 21 and 23 in the directions of the arrows 37 and 52, respectively, or both in a counter-clockwise direction, as shown.

It is to be appreciated from the showings of FIGS. 1 and 2 that the hop separating flights of the present invention constitute what may be termed second, third and fourth operations of hop separation; the first hop separation occurring in the trommel 11 which is the subject matter of the aforementioned copending application entitled "Power Trommels," while the second, third and fourth operations of hop separation are effected by these hop separation flights consisting of the top or first endless screen 21, the intermediate imperforate plate 22 and the lower or second endless screen 23. The fifth operation of hop separation from the mixtures of foreign material is carried out by the multi-slotted surface and associated mechanism described and claimed in my aforesaid copending application, Serial No. 670,567, now Patent No. 2,983,380, with the result that there is appreciably less than 1% of foreign material remaining in the mixtures of hops and foreign material that are derived from the hop-picking machine, not shown, and carried from the hop-picking machine to the top of the trommel 11 by the elevator conveyor 12. The second, third and fourth operations of hop separation effected by the improved hop separating flights hereinabove described and hereinafter claimed appreciably reduces the work to be done by the multi-slotted surface 70, and associated mechanism, described and claimed in my aforementioned copending application, Serial No. 670,-567, now Patent No. 2,983,380.

It is to be understood that the appended claims are to be accorded a range of equivalents commensurate in scope with the advances made over the prior art.

I claim:

1. In hop separating flights for separating hops from foreign material including leaves and fragments of leaves, a movably mounted inclined endless screen upon upper run of which rapidly moving mixtures of hops and foreign material are deposited for moving down and off the lower end thereof, means for moving the upper run of said inclined endless screen counterclockwise, an inclined imperforate plate supported below the lower end of said inclined endless screen and in a plane at lower elevation than and substantially paralled to the plane of said inclined endless screen for receiving the leaves and fragments of leaves moving off the lower end of said inclined endless screen and retarding the rate of movement thereof, and means for directing rapidly moving currents of air toward the lower end of said imperforate plate for blowing leaves and fragments of leaves moving off the lower end of said imperforate plate away from the plane of said imperforate plate.

2. In hop separating flights for separating hops from foreign material including leaves and fragments of leaves, an inclined top endless screen upon which rapidly moving mixtures of hops and foreign material are deposited for moving down and off the lower end thereof, means for moving the upper run of said top endless screen counter-clockwise to take off appreciable quantities of foreign material from said mixtures over the top of said top endless screen, an inclined imperforate plate supported below the lower end of said top endless screen and in a plane at a lower elevation than and substantially parallel to the plane of said top endless screen for receiving fragments of leaves and leaves moving off the lower end of said top endless screen and retarding the rate of movement thereof, and means for directing successive blasts of air against the lower end of said imperforate plate to blow off retarded leaves and fragments of leaves that move off the lower end of said imperforate plate.

3. In hop separating flights as defined in claim 2, and including a bottom endless screen supported at a less incline to the vertical than and contiguous to the lower end of said imperforate plate for receiving on the upper run thereof leaves and fragments of leaves blown away from the lower end of said imperforate plate, and means for moving the upper run of said bottom endless screen to carry up and over the top thereof leaves and fragments of leaves flattened against the same by said blasts or currents of air.

4. Hop separating flights for receiving successive moving mixtures of hops and foreign material, said flights comprising an elevated inclined top endless movable screen on which rapidly moving mixtures of hops and foreign material are initially deposited, an inclined imperforate stationary plate supported contiguous to but below the lower end of said top endless screen and in a plane parallel to but below the plane of said top endless screen for receiving and retarding the rate of movement of mixtures of foreign material moving off the lower end of said top endless screen, an elevated inclined bottom endless screen movably mounted at a less angle to the vertical than said inclined top endless screen and contiguous to the lower end of said imperforate plate for receiving the retarded mixtures of foreign material from the lower end of said imperforate plate, means for moving the upper runs of said endless screens counter-clockwise to carry some foreign material removed from said mixtures up and over the tops thereof, and means for flattening some of the retarded foreign material of the mixtures against the upper run of said bottom endless screen for removal over the top thereof, and for carrying some of the foreign material through the perforations of said bottom endless screen.

5. Hop separating flights for removing substantial amounts of foreign material including hop vine leaves, fragments of leaves, long and short stems and other debris from moving mixtures of hops and foreign material to separate the hops therefrom, said flights comprising an elevated top endless screen movably mounted at an angle to the vertical to allow separated hops to roll down the same as well as to allow foreign material to move down the same at a relatively rapid rate, means for directing rapidly moving mixtures of hops and foreign material onto said top screen, an imperforate plate supported on and contiguous to said top screen and below the lower end thereof in parallel relationship thereto for receiving foreign material including leaves, fragments of leaves and other debris that moves down and off the lower end of said top screen and for retarding the rate of movement of said foreign material, an elevated bottom endless screen movably mounted contiguous to said imperforate plate and at a less angle of inclination to the vertical than the angle of inclination of said top screen, means for moving said top and bottom inclined screens with their upper runs moving counter-clockwise so as to carry over the tops thereof some of the foreign material deposited thereon with said moving mixtures of hops and foreign material while permitting separated hops to roll down said inclined screens, and means for directing currents of air toward the juncture of said imperforate plate and said bottom endless screen and through said bottom endless screen to carry some of the foreign material through the perforations thereof and to hold some leaves and fragments of leaves against the upper run of said bottom endless screen so that said leaves and fragments of leaves are carried up over the top of said bottom endless screen thereby removing the same from said moving mixtures of hops and foreign material.

6. In hop separating flights for effecting the removal of hops from foreign material containing leaves, fragments of leaves, hop vine stems and the like, an elevated endless movable pervious screen supported at an angle of approximately 45° to the vertical, means for depositing moving mixtures of hops and foreign material on the upper run of said elevated endless screen adjacent to the top thereof, a lower endless movable pervious screen supported below said elevated endless screen at an angle of approximately 30° to the vertical; said lower endless screen being adapted to receive on the upper run thereof moving mixtures of hops and foreign material passing from said elevated endless screen, means for constantly moving currents of air toward the top of said lower endless pervious screen to flatten leaves and fragments of leaves against the upper run thereof and to blow some of the leaves and fragments of leaves through the perforations of both the upper run and lower run thereof, means for moving said elevated endless screen and said lower endless screen to cause the upper runs thereof to move counter-clockwise in unison to carry leaves and fragments of leaves flattened against the upper run of said lower endless screen over the top thereof, and a stationary imperforate plate supported contiguous to the lower end of said elevated endless screen in substantially parallel relationship thereto and below the same for receiving moving leaves and fragments of leaves from the lower end of said elevated endless screen and for retarding the rate of movement of some of said leaves and said fragments of leaves so that they drop off the lower end of said stationary imperforate plate to meet currents of air generated by said means for moving currents of air and to be carried over the top of said lower endless screen.

References Cited in the file of this patent

UNITED STATES PATENTS

| | | |
|---|---|---|
| 174,929 | Velie | Mar. 21, 1876 |
| 625,295 | Elder | May 16, 1899 |
| 1,323,877 | Lee et al. | Dec. 2, 1919 |
| 1,449,044 | Herche | Mar. 20, 1923 |
| 1,715,197 | Grabill | May 28, 1929 |
| 1,895,268 | Silver | Jan. 24, 1933 |
| 1,964,637 | Hurxthal | June 26, 1934 |
| 2,087,813 | Peterson | July 20, 1937 |
| 2,114,727 | Thys | Apr. 19, 1938 |
| 2,157,301 | Neuman | May 9, 1939 |
| 2,226,009 | Miller | Dec. 24, 1940 |
| 2,228,977 | Rogers | Jan. 14, 1941 |
| 2,275,959 | Hamachek | Mar. 10, 1942 |
| 2,371,067 | Rivers | Mar. 6, 1945 |
| 2,481,897 | Anderson | Sept. 13, 1949 |
| 2,591,860 | Owens | Apr. 8, 1952 |
| 2,707,554 | Dempsey | May 3, 1955 |